May 21, 1957 B. H. PUERNER 2,793,020
METHOD AND APPARATUS FOR SUPPLYING A KILN WITH
A UNIFORM FLOW OF SECONDARY COMBUSTION AIR
AT A CONSTANT TEMPERATURE
Filed Aug. 17, 1954
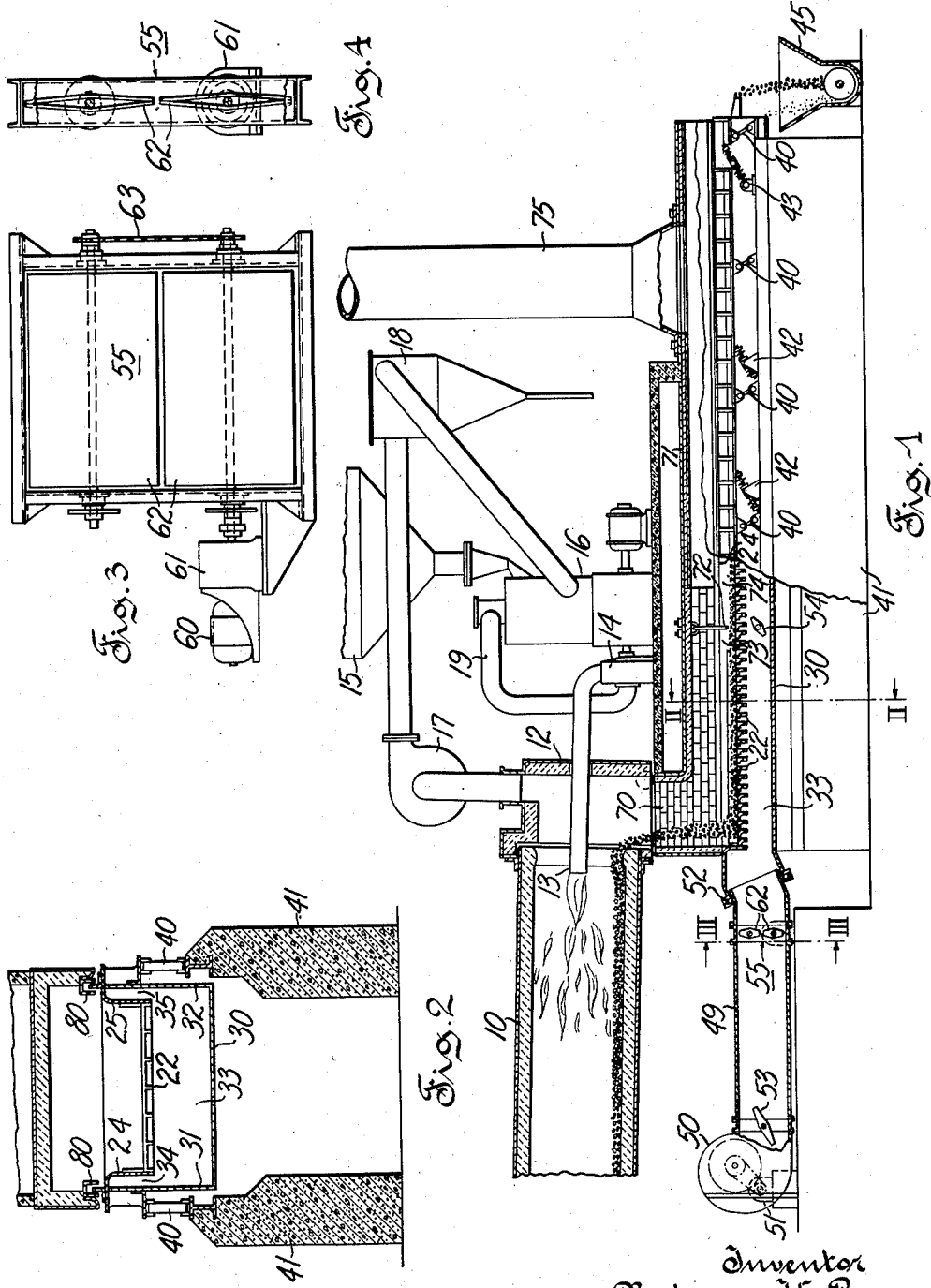
Inventor
Bertram H. Puerner
by Wayne D. Easton
Attorney

United States Patent Office 2,793,020
Patented May 21, 1957

2,793,020

METHOD AND APPARATUS FOR SUPPLYING A KILN WITH A UNIFORM FLOW OF SECONDARY COMBUSTION AIR AT A CONSTANT TEMPERATURE

Bertram H. Puerner, Wauwatosa, Wis., assignor to Allis-Chalmers Manufacturing Company, Milwaukee, Wis.

Application August 17, 1954, Serial No. 450,493

5 Claims. (Cl. 263—32)

The present invention relates generally to kilns and auxiliary equipment for the heat treatment of various raw materials, particularly for the burning of cement, the heat treatment of ores of various kinds, and the heat treatment of alkaline earth carbonates such as limestone, magnesite and dolomite. The invention relates particularly to a method and apparatus for supplying a substantially uniform flow of heated secondary air having a substantially constant temperature to the firing hood of such a kiln.

Although the kiln and auxiliary equipment illustrated herein may be utilized for the heat treatment of the various materials referred to, only cement and cement clinker will be referred to hereinafter for the sake of convenience.

A rotary kiln of the type having a firing hood and a discharge opening at one end thereof is commonly used for the manufacture of cement and other materials. Cement clinker at a temperature between 2000° F. and 2400° F. is discharged from such a kiln to a cooler wherein the clinker is cooled rapidly by a flow of cooling air which is directed through the clinker.

A rotary kiln is normally provided with a burner arrangement, including a fan or blower, in which air referred to as primary combustion air is utilized to transfer and introduce fuel from a fuel container to the firing hood of the kiln where the mixture of fuel and primary combustion air is burned. Primary combustion air commonly is preheated air and various types of heat exchange devices or systems for utilizing the heat of the hot clinker discharged to the cooler for preheating the primary combustion air are in use. The primary combustion air may be obtained from other sources, however, such as directly from the atmosphere.

In order to obtain efficient combustion and to maintain an oxidizing atmosphere in the kiln, it is necessary to introduce a considerable amount of excess air to the firing hood of the kiln and such air is referred to as secondary combustion air. It is desirable that the secondary combustion air be at a high temperature and air utilized to cool the clinker at the receiving end of the cooler, where the clinker is the hottest, becomes highly heated and is directed to the firing hood of the kiln where it is utilized as secondary combustion air.

The type of cooler which is generally suitable for cooling hot cement clinker discharged from the kiln has some sort of a perforate support for receiving heated clinker from the discharge opening of the kiln and the support is actuated so as to advance the clinker in the form of a moving bed from the receiving end to the discharge end of the perforate support. Cooling air is directed through the clinker bed and the cooling air which is passed through the bed at the receiving end of the perforate support, where the clinker is the hottest, is utilized as secondary combustion air for the kiln.

In manufacturing cement the operation of the kiln is of a very exacting nature because a high quality product can be produced only if the temperature to which the raw materials in the kiln is subjected is maintained within narrow limits. One difficulty which has caused operators of kilns considerable concern, and which is primarily responsible for erratic operation of kilns, is the difficulty of maintaining the temperature and the rate of flow of the secondary combustion air obtained from the cooler reasonably constant. The temperature and the rate of flow of the secondary combustion air to be supplied to the kiln is definitely fixed by the amount of fuel to be burned and other operating requirements of the kiln. Although the cooling air directed through the clinker bed in the cooler can be supplied by a fan or blower at a nearly constant rate and temperature with no difficulty, it is the condition of the clinker bed in the cooler that determines the temperature and the rate of flow of the secondary combustion air supplied to the kiln.

Cement clinker which is discharged from the kiln to the cooler consists for the most part of small size nodules mingled with larger sized nodules, grit and dust, and lumps of clinker. The clinker as it is discharged to the cooler is distributed somewhat irregularly on the perforated support of the cooler to form a bed having portions which are substantially thicker than the rest of the bed and at times there are portions of the perforated support which are completely uncovered.

This irregular distribution of clinker on the perforated support permits cooling air to blow freely through some portions of the support while virtually no air at all passes through other portions of the support which are covered by islands of dense material. Fine particles of clinker are blown upwardly by the rapid flow of air around the islands of dense material and the particles are deposited on the inactive surfaces of the islands of dense material causing the islands to grow. At the same time, the bare portions of the perforate support through which the air is rapidly passing also increase in area.

When the clinker bed is in this condition it of course does not offer uniform resistance to the flow of cooling air therethrough and the bed is not uniformly penetrated by the cooling air. The temperature and the rate of flow of the secondary combustion air supplied to the kiln under such conditions fluctuate within wide limits. When the resistance of the bed is relatively low, for example, the temperature of the secondary combustion air is relatively low and the relative volume thereof supplied to the kiln is high, the result being that the required kiln temperature is not maintained and the quality of cement clinker produced is poor. When the resistance of the bed is relatively high the temperature of the secondary combustion air becomes too hot and the volume thereof supplied to the kiln is low, the result being that the high heat of the secondary combustion air causes oversized clinkers to be formed and the low volume of secondary combustion air lowers the combustion efficiency of the burning apparatus and, furthermore, prevents the atmosphere in the kiln from being as oxidizing as desired.

There of course are controls for the cooler which can be utilized to control the condition of the secondary combustion air to the kiln. One of the controls involves regulating the effective conveying speed of the perforate support so that the clinker bed becomes thicker or thinner and thus provides more or less resistance to the flow of cooling air through the bed. Another control is an adjustable damper in the discharge outlet of the fan which supplies the cooling air for the cooler. Still another control is an adjustable damper which can be utilized to control the amount of cooling air passing through the portion of the clinker bed which supplies the heat for the secondary combustion air.

There are two reasons why the controls referred to are not suitable for regulating the temperature and the rate of flow of secondary combustion air supplied to the kiln, however. One reason is that the variableness of the condition of the secondary combustion air is caused by the irregular distribution of the clinker on the perforate support and the manipulation of the three controls referred to above does not remove the cause of the difficulty but merely compensates for it temporarily. As the distribution of the clinker on the perforate support changes constantly, the controls must be correspondingly adjusted and the operator of the kiln, in adjusting the controls, is constantly hunting for proper settings of the controls which will provide for stable operation of the kiln. Adjustment of the controls referred to cannot provide stable operation, however, because the adjustment of the controls does not in any way control the cause of the unstable operation which is the irregular distribution of the clinker on the perforate support of the cooler.

The second reason why the controls referred to are not suitable for regulating the temperature and quantity of the secondary combustion air supplied to the kiln is that each adjustment of one of these controls affects the operation of the kiln and cooler in other respects. If, for example, the conveying speed of the perforate support is slowed so that the clinker bed becomes thicker and presents a greater resistance to the flow of cooling air therethrough, so as to reduce the rate of flow of secondary combustion air supplied to the kiln, the clinker on the perforate support may not be cooled as rapidly as is necessary to obtain sufficiently brittle clinkers which are desirable from the grinding standpoint. Or, if the dampers which control the amount of cooling air passing through the portion of the clinker bed which supplies the heat for the secondary combustion air are adjusted to increase the flow of secondary combustion air because of a temporary increase in the resistance of the bed, the temperature of the secondary combustion air supplied to the kiln decreases and the raw materials in the kiln may not be subjected to a sufficiently high temperature to produce high quality cement.

The method and apparatus of the present invention are effective to maintain the temperature and the rate of flow of the secondary combustion air supplied to the kiln from the cooler substantially constant and this is a main object of the invention. In general, this object is achieved by periodically interrupting the flow of cooling air which is directed through the moving bed of clinker in the cooler to subject the bed to intermittent blasts of air so as to agitate the bed sufficiently to cause the bed to have a constant depth and an even distribution of clinker in the bed. The result is that the bed of clinker then offers uniform resistance to the flow of cooling air therethrough and a substantially uniform flow of secondary combustion air having a substantially constant temperature is supplied to the kiln. The impacts to the bed caused by periodically interrupting the flow of cooling air therethrough serve to agitate the bed sufficiently so that the islands of dense material are broken up and the clinker is distributed evenly on the perforate support.

The periodic interruptions of the flow of cooling air through the clinker bed permit further agitation of the bed during the intervals between the impacts because during such intervals there is a rapid expansion of cooling air trapped in voids of the clinker bed. Cooling air trapped in the bed of hot clinker expands so rapidly that the bed is violently agitated. The effectiveness of the agitation caused by the expansion of the air which becomes trapped in the voids of the clinker bed may be observed at the surface of the bed which, from the appearance of it, gives one the impression that the bed is boiling. The rapid expansion of the air trapped in the voids of the bed has the effect of a multitude of minor explosions which serve to effectively agitate the bed.

In addition to sufficiently agitating the bed of clinker in the cooler so that a substantially uniform flow of secondary combustion air having a substantially constant temperature is supplied to the kiln, the agitating of the bed by periodically interrupting the flow of cooling air therethrough also has the beneficial result of preventing the grate bars of the perforate support from being alternately cooled and heated and subsequently warped from such alternate cooling and heating. When portions of the perforate support of the cooler are covered by dense islands of material and other portions are bare, as explained above, the hot clinker constituting the islands of dense material, through which no air passes, hugs the grates very tightly and heats them excessively while the air blowing through the bare portions of the support cools the grates. When an island of dense material moves away from a portion of the grate which had become heated by the presence of the island, cooling air which rushes through the resulting bare spot causes a rapid chilling of the grate member with resulting warpage or distortion thereto. When the bed of clinker is thoroughly agitated so as to be uniformly distributed on the grate, as a result of periodically interrupting the flow of cooling air through the clinker bed, as explained above, the grate bars and all portions of the perforate support are uniformly cooled at all times and are not subjected to alternate heating and cooling. It is therefore another object of the invention to extend the life of the grate bars of the perforate support by preventing the grate bars from being subjected to alternate heating and cooling which causes warpage and distortion.

Other objects and advantages of the invention will appear from a detailed description of the invention which is described below and illustrated in the accompanying drawing:

Fig. 1 is a side view, partly in section, of a kiln and cooler assembly embodying the invention;

Fig. 2 is an enlarged sectional view taken on line II—II of Fig. 1;

Fig. 3 is an enlarged view taken on line III—III of Fig. 1 of the damper assembly shown in Fig. 1; and Fig. 4 is a side view of the damper assembly shown in Fig. 3.

Referring to Fig. 1, a kiln which is illustrated by way of example as a rotary type kiln 10 is supported for rotation about a slightly inclined axis. The kiln is adapted to deliver a hot granular material, such as cement clinker, by gravity from the discharge end of the kiln. A firing hood 12 is positioned over the discharge end of the kiln and has a large bottom opening through which clinker discharged from the kiln may pass.

Kiln 10 is fired by means of a burner arrangement which includes an injection nozzle 13 through which a fluent fuel such as powdered coal or oil is delivered by means of a flow of air created by a fan or blower 14. Injection nozzle 13 extends through firing hood 12 and the air delivered to the kiln through nozzle 13 is referred to as primary combustion air.

Primary combustion air for the kiln may be obtained directly from the atmosphere or other sources and, as illustrated herein, the primary combustion air is obtained from the firing hood 12 of the kiln. A coal bin 15 and a coal grinding mill 16 are provided. A blower 17 draws heated air from firing hood 12 and discharges the heated air through a dust collector 18 to grinding mill 16. Blower 14 draws the heated air from grinding mill 16, wherein powdered coal enters the air stream, through a pipe 19 and delivers the mixture of primary combustion air and powdered coal to the kiln through injection nozzle 13.

A flame is projected from the injection nozzle 13 and directed on the raw materials in the kiln to effect the desired heat treatment and produce hot clinker. The secondary combustion air supplied to the firing hood 12 is in excess of the amount necessary to supplement the primary combustion air to support the combustion in the kiln efficiently and a portion of the secondary combustion air may be drawn from firing hood 12 through blower 17 and utilized as preheated primary combustion air as explained.

The hot clinker discharged from kiln 10 through the bottom opening of firing hood 12 is received by a cooler of the type having a perforate support 22 upon which the hot clinker is received at one end thereof and advanced in the form of a moving bed toward the discharge end of the support.

As illustrated herein by way of example, the cooler is provided with a vibratable type perforate support 22 which is positioned horizontally below the level of the bottom opening of the firing hood 12. Perforate support 22 comprises a grate structure formed with crossbars which are spaced from each other to permit cooling air to pass upwardly through the spaces.

Perforate support 22 is provided with side plates 24 and 25 extending longitudinally thereof and is mounted in a longitudinally extending trough which comprises an imperforate floor portion 30 and side walls 31 and 32. The trough is of sufficient width and depth so that the perforate support 22 and the side plates 24 and 25 attached thereto are respectively spaced from the floor portion 30 and the side walls 31 and 32 of the trough. With this arrangement there is formed an air duct 33 which extends below support 22 between the charge end and discharge end thereof and longitudinally extending spaces 34 and 35 between the side plates 24 and 25 and the side walls 31 and 32 of the trough. The upper portions of side plates 24 and 25 are formed to respectively join the upper portions of side walls 31 and 32 to enclose spaces 34 and 35.

The trough in which perforate support 22 is mounted is supported for reciprocating movement on rearwardly inclined links 40 which are attached to the trough and foundation members 41. The links 40 are prevented from collapsing and the reciprocating motion of the trough is controlled by opposed coil springs arranged in assemblies 42. A reciprocating motion relative to foundation members 41 is imparted to the trough by suitable means indicated at 43. Such means include a motor and means for varying the frequency of the reciprocating motion which are mounted on the hidden side of the apparatus illustrated in Fig. 1 and are not shown. In operation the trough and the perforate support 22 mounted therein each have a short backward and forward motion with a slight rise on the forward stroke which conveys the material in a stream, the direction of advancement of the stream being away from the kiln. The trough may have a travel of approximately one inch in each direction at a rate of from 300 to 400 strokes per minute. Hot material from the kiln 10, such as cement clinker, falls directly on perforate support 22 and forms a moving bed of clinker which is continuously discharged at the discharge end of perforate support 22.

As the perforate support 22 and the floor portion 30 of the trough are rigidly connected they vibrate as a unit and the fine material collecting on the floor portion 30 is advanced simultaneously with the coarser material on perforate support 22. A cross conveyer 45 receiving the coarse material from perforate support 22 will also receive the fine material discharged from the floor portion 30.

Cooling air is forced into the trough by a fan 50 driven by an electric motor 51. The discharge pipe 49 of fan 50 projects into the trough below the clinker receiving end of perforate support 22. As fan 50 is stationarily mounted, a flexible connection 52 is provided to permit movement of the trough relative to the fan 50 and its discharge pipe 49. An adjustable damper 53 is provided at the outlet of fan 50 so that the total quantity of cooling air supplied to the cooler may be regulated. Also provided is an adjustable damper 54 mounted in the trough intermediate the ends of perforate support 22 for regulating the division of cooling air directed upwardly through the perforate support on each side of damper 54. The circulation of cooling air in the longitudinally extending spaces 34 and 35 from fan 50 serves to cool the side plates 24 and 25 mounted on perforate support 22.

A rotating damper assembly 55 is disposed in operable relation to fan 50 for periodically interrupting the flow of cooling air supplied by fan 50 to the trough. In the illustrated embodiment of the invention damper assembly 55 is disposed between damper 53 and the inlet of the trough. The damper assembly 55 includes an electric motor 60, a speed reducer unit 61 and one or more damper blades 62. When two damper blades 62 are utilized as illustrated, gear or chain means 63 are utilized to rotate the blades at the same speed. The blades are mounted and arranged in phase with each other so that the blades operate jointly to periodically interrupt the flow of cooling air supplied to the trough by fan 50.

A stationary hood for collecting air directed upwardly through the perforate support 22 and the moving bed of clinker thereon is arranged above the vibratable trough in which perforate support 22 is mounted. The hood is suitably supported on a frame structure and comprises a brick portion 70 and a sheet metal portion 71. Mounted in the sheet metal portion 71 of the hood intermediate the ends of perforate support 22 is an adjustably positioned partition 72 which allows sufficient space for the moving bed of clinker on perforate support 22 but otherwise divides the hood into two chambers 73 and 74 to which cooling air directed upwardly through perforate support 22 flows. The brick portion 70 of the hood is joined with the firing hood 12 of the kiln to provide a passage for the flow of secondary combustion air from chamber 73 of the hood to the kiln. The sheet plate portion 71 of the hood has a stack 75 mounted thereon which communicates with chamber 74 of the hood to provide a passage for the flow of air from chamber 74 to the atmosphere.

Suitable sealing means 80 are provided between the stationary hood and the side walls 31 and 32 of the vibratable trough to obstruct the escape of air, which is dust ladened, from the chambers 73 and 74 of the hood.

In the operation of the kiln and cooler assembly hot cement clinker at a temperature between 2000° F. and 2400° F. is discharged through the bottom opening of the firing hood 12 of the kiln onto the receiving end of perforate support 22. The vibrational movement of the trough causes perforate support 22 mounted therein to have a conveying action which causes the clinker deposited on perforate support 22 to be formed into a moving bed which advances toward the discharge end of perforate support 22. The speed at which the trough is operated, which may be 300 to 400 strokes per minute, determines the average depth of the bed of clinker on perforate support 22. This average depth is normally maintained in the neighborhood of four inches.

Cooling air for cooling the cement clinker on perforate support 22 is supplied by fan 50. Damper 53 is adjusted to regulate the total quantity of cooling air to be supplied and damper 54 is adjusted to divide the cooling air so that a portion is directed through the hottest section of the clinker bed on perforate support 22 to chamber 73 of the hood, and the remaining portion is directed through the cooler section of the clinker bed to chamber 74 of the hood and then to the atmosphere through stack 75. The heated cooling air in chamber 73 of the hood is directed to the firing hood 12 of the kiln where a portion of such heated air is utilized as secondary combustion air and a portion is withdrawn by blower 17 and utilized as primary combustion air.

It will be understood that from the standpoint of this invention the flow of air upwardly through perforate support 22 into chamber 73 is of primary importance. It is within the contemplated scope of the invention that all or only a portion of the air supplied by whatever air supply means is utilized may be directed to chamber 73, regardless of the route the flow of air takes before it passes through the portion of the bed of clinker in chamber 73.

Damper assembly 55 functions to periodically interrupt the flow of cooling air supplied by fan 50. The speed at which damper assembly 55 operates is dependent on various factors such as the depth of the bed of clinker on perforate support 22. An optimum speed for a particular installation is obtained by adjusting the speed until desirable operating conditions are obtained. If the speed is too low or too high, sufficient agitation of the clinker bed is not obtained. A general range which can be stated by way of illustration only would be 60 to 150 revolutions per minute and this range would represent 120 to 300 interruptions a minute of the cooling air supplied by fan 50. It is expected, however, that there may be optimum speeds outside of this range for the damper assembly 55 depending upon the characteristics of particular installation involved.

It is described in detail in the introduction of this specification how the periodic interruptions of the flow of cooling air effected by operation of damper assembly 55 causes sufficient agitation in the clinker bed on perforate support 22 to have a constant depth and uniform distribution. The beneficial result is that the bed of clinker then offers uniform resistance to the penetration of cooling air therethrough and a substantially uniform flow of secondary combustion air having a substantially constant temperature is supplied to the firing hood 12 of the kiln. A further beneficial result, as explained hereinabove, is that the grate bars of perforate support 22 are uniformly cooled at all times and therefore not subjected to alternate heating and cooling which causes warpage and distortion of the grate bars.

The periodic interruption of the flow of cooling air supplied by fan 50 has resulted in improved operating characteristics of the kiln and cooler assembly in several respects. One improvement is that the dampers 53 and 54, each of which can be used to control the amount of cooling air to be passed through the hottest part of the clinker bed, can each be locked in position and the flow of secondary air supplied to the kiln can be successfully controlled by merely regulating the vibrational speed of the perforate support 22. Previously it had been necessary to constantly regulate both the vibrational speed of perforate support 22 and the setting of damper 53 to control the temperature and rate of flow of secondary combustion air supplied to the kiln.

Another beneficial result of periodically interrupting the flow of cooling air supplied by fan 50 is that the depth of the clinker bed on perforate support 22 can be one-half inch to one inch deeper than previously while the temperature of the secondary cooling air supplied to the kiln is maintained at the same level obtained with a thinner bed. This result appears to be attributable to a greater efficiency of heat transmission between the clinker bed and cooling air directed therethrough when the flow of cooling air is periodically interrupted.

A characteristic of kiln operation caused by periodically interrupting the flow of cooling air supplied by fan 50 is that related periodic pressure variations were evident in the firing hood 12 of the kiln. No effect was observed on the flame projected by injection nozzle 13, however.

It should be understood that it is not intended to limit the invention to the exact details of construction and mode of operation described herein for various modifications within the scope of the claims may occur to persons skilled in the art.

It is claimed and desired to secure by Letters Patent:

1. A method of supplying a substantially constant flow of heated secondary combustion air having a substantially constant temperature to the firing hood of a kiln comprising the steps of forming heated material discharged from the firing hood of the kiln into a moving bed of material, continuously alternating between directing a flow of air upwardly through the moving bed of material to cool the material and heat the air for a predetermined interval of time and then interrupting said flow of air so that the bed is continuously agitated by being subjected to repeated impacts by the periodically interrupted flow of air and is agitated during the times between such impacts by the rapid expansion of air trapped in the heated material in the bed, such agitation being effective to cause an even distribution of material in the bed so that the bed offers substantially uniform resistance to the flow of air therethrough, and directing a portion of said flow of air to the firing hood of said kiln for use as secondary combustion air.

2. A method of supplying a substantially constant flow of heated secondary combustion air having a substantially constant temperature to the firing hood of a kiln comprising the steps of forming heated material discharged from the firing hood of the kiln into a moving bed of material, continuously alternating between directing a flow of air upwardly through the moving bed of material for a selected predetermined interval of time to cool the material and heat the air and then interrupting said flow of air so that the bed is continuously agitated by being subjected to repeated impacts by the periodically interrupted flow of air and is agitated during the times between such impacts by the rapid expansion of air trapped in the heated material in the bed, such agitation being effective to cause an even distribution of material in the bed so that the bed offers substantially uniform resistance to the flow of air therethrough, directing said flow of air to the firing hood, withdrawing and utilizing a portion of said air from said firing hood for primary combustion air, and utilizing the remaining portion of said air in the firing hood as secondary combustion air.

3. A method of supplying a substantially constant flow of heated secondary combustion air having a substantially constant temperature to the firing hood of a kiln comprising the steps of forming heated material discharged from the hood of the kiln into a moving bed of material, continuously alternating between directing a flow of air upwardly through the moving bed of material for a selected predetermined interval of time and then interrupting said flow of air to cause continuous agitation of said bed and thereby obtain a constant depth and an even distribution of material so that the bed offers substantially uniform resistance to the flow of air therethrough, and directing a portion of said flow of air to the firing hood of said kiln for use as secondary combustion air.

4. In combination, a kiln having a firing hood and a discharge opening at one end thereof, a conveying mechanism including a perforate support arranged to convey heated material from the discharge opening of the firing hood of said kiln and advance it in the form of a moving bed toward a discharge end of said support, a duct extending below said support, hood means mounted above said support defining a chamber which communicates with the interior of the firing hood of said kiln, air supply means for causing air to flow into said duct and through said perforate support and through said chamber to the interior of said firing hood where at least a portion of said air is used as secondary combustion air, air flow control means operably disposed in relation to said air supply means and operative to interrupt the flow of air delivered to said perforate support and operating means connected to said air flow control means, said operating means being responsive to a selected predetermined interval of time to operate said flow control means to reduce for a second selected predetermined interval of time the flow of air delivered to said perforate support.

5. In combination, a kiln having a firing hood and a discharge opening at one end thereof, a conveying mechanism including a vibratable perforate support arranged to convey heated material from the firing hood of said kiln and advance it in the form of a moving bed toward a discharge end of said support, a duct extending below said support, hood means mounted above said support defining a chamber which communicates with the interior of the firing hood of said kiln, air supply means for causing air to flow into said duct and through said perforate support and through said chamber to the interior of said firing hood where a portion of said air is utilized as secondary combustion air, at least one damper mounted within said air supply means and rotatable about an axis perpendicular to the path defined by said air supply means and said damper being operative to interrupt the flow of air when said damper is perpendicular to the path defined by said air supply means, variable speed motor means drivingly connected to said damper for continuously rotating said damper, said damper operating to interrupt the flow of air twice during each revolution of said damper, and means including a conduit communicating with the interior of said firing hood for withdrawing a portion of said air supplied to said firing hood for use as a primary combustion air.

References Cited in the file of this patent
UNITED STATES PATENTS

| | | |
|---|---|---|
| 2,095,446 | Lee | Oct. 12, 1937 |
| 2,160,956 | Chessman | June 6, 1939 |
| 2,666,632 | Culver et al. | Jan. 19, 1954 |

FOREIGN PATENTS

| | | |
|---|---|---|
| 5,801 | Great Britain | 1908 |